June 17, 1969

A. C. WURDACK 3,450,945

CIRCUIT SWITCHING AND PROTECTING ARRANGEMENT

Filed Dec. 6, 1966

INVENTOR.
Albert C. Wurdack
BY
ATTORNEY

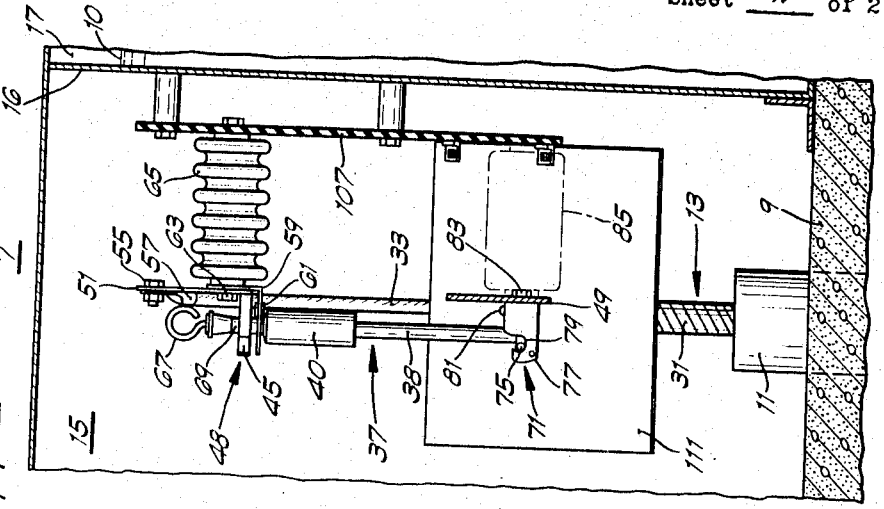
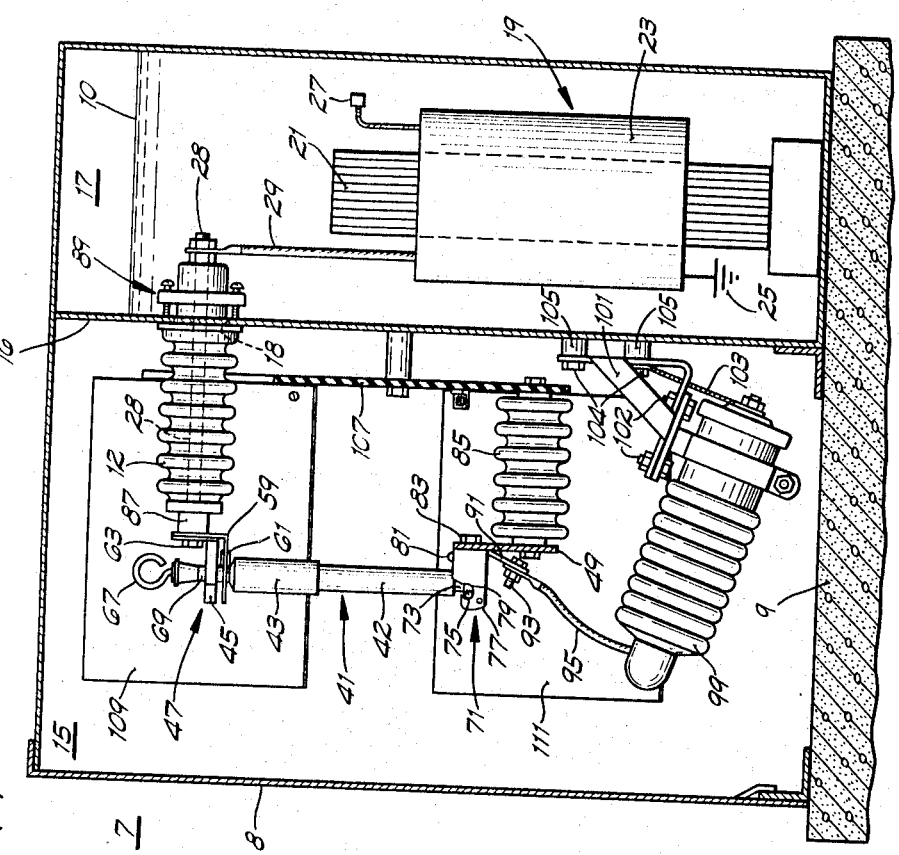

June 17, 1969

3,450,945
CIRCUIT SWITCHING AND PROTECTING
ARRANGEMENT
Albert C. Wurdack, Zanesville, Ohio, assignor to McGraw-Edison Company, Milwaukee, Wis., a corporation of Delaware
Filed Dec. 6, 1966, Ser. No. 599,428
Int. Cl. H02h 7/04, 1/04; H02g 9/02
U.S. Cl. 317—15     12 Claims

ABSTRACT OF THE DISCLOSURE

An electrical switch and fuse assembly and arrangement in which each switch and fuse has a lower pivotable end mounted at a substantially common point and electrically connected together. The upper ends of each switch and fuse are spaced apart and connected through jaw contacts to electrical cables. The electrical cables connected to the switches approach the switch and fuse assembly from below and are terminated through stress cones and insulation beside the fuse and switch assembly, utilizing the space created by mounting the lower switch ends at a substantially common point for termination.

---

This invention relates to fuse and switching arrangements for distribution transformers.

Overhead electrical power distribution systems are aesthetically displeasing and detract from the beauty of residential areas. In an attempt to improve the aesthetic appearance of distribution systems electrical utilities have installed buried cable with distribution transformers enclosed in metallic housings supported on concrete pads at ground level. Such an underground distribution system minimizes the problem of wind, ice and tree limb damage and reduces the likelihood of lightning damage. Such metallic housings conventionally include a sealed compartment filled with oil and enclosing a transformer core and coil assembly, and compartments for the accompanying primary and secondary switching and protecting apparatus.

Ground level transformers are often connected in a loop or a modified loop power distribution system. The underground primary cables connecting the primary switching apparatus and the distribution transformer to the loop extend through conduits in the concrete pad and into the primary compartment. The underground primary cables are conventionally terminated in stress grading cones within the primary compartment and are connected to the hinge contacts of sectionalizing switches within the primary compartment. The jaw or stationary contacts of the sectionalizing switches are usually mounted at the ends of a bus bar which also supports the stationary contact of the disconnect fuse. The disconnect fuse has a hinge end mounted on a primary bushing and electrically connected through the primary bushing to the primary winding of the electrical transformer within the oil filled sealed compartment.

The sectionalizing switches of many such ground level transformers are incapable of interrupting magnetizing and load current to the transformer and require auxiliary load break devices with special contact means to engage the auxiliary load break device and necessitate that the ground level housing be of increased size to permit operation of the auxiliary load break device within the housing. The fuse of many such ground level transformers is of the boric acid expulsion type which involves great quantities of ionized gas in operating that tend to distort the enclosure and create an explosive noise, making it unpleasant and dangerous for the line man to operate the fuse even with a hot stick.

Ground level transformer housings are aesthetically displeasing in a residential lot, and known ground level housings are particularly objectionable because of their height. This height is necessitated by the dimension required for the stress cone on each primary cable and the long length of insulation covering the surface of the cable between the stress cone and the sectionalizing switch hinge contact to prevent flashover along the surface of the cable insulation at the relatively high primary voltage. Further, the potential to ground at the bus bar of such switch and fuse arrangement can double when lightning strikes a power line or a surge occurs as a result of fuse operation, due to reflection at the opening in the cable when the fuse is open or one of the sectionalizing switches is open to provide a modified loop. An arrangement with the fuse and sectionalizing switches mounted on a common bus bar makes it difficult if not impossible to mount a lightning arrestor within the ground level housing to protect the apparatus against such high potentials.

It is an object of the invention to provide an improved fuse and sectionalizing switch arrangement for ground level distribution transformers which permits the height of the housing to be substantially reduced in comparison to prior art apparatus. It is a further object of the invention to provide such an improved fuse and sectionalizing switch arrangement which permits a substantial reduction in the height of the housing and also provides an exceptionally long creepage path between the stress cones and the sectionalizing switch contacts along the surface of the underground primary cable. Another object of the invention is to provide such an improved switch and sectionalizing switch arrangement which provides easy and facile mounting of a lightning arrestor in a position wherein it can protect the apparatus against a high transient voltage on either cable even when one of the sectionalizing switches or the fuse of the primary winding is open.

Still another object of the invention is to provide such a fuse and switching arrangement wherein the sectionalizing switches are capable of interrupting magnetizing and load current to the transformer and the transformer primary fuse operates without appreciable evolution of ionized gas and with little or no noise.

These and other objects and advantages of the invention will be more readily apparent from the following detailed description when considered in conjunction with the accompanying drawing wherein:

FIG. 2 is a sectional view showing the disconnect fuse assembly taken along line 2—2 of FIG. 1;

FIG. 3 is a sectional view showing a sectionalizing switch assembly partially in phantom taken along line 3—3 of FIG. 1;

Figure 4:
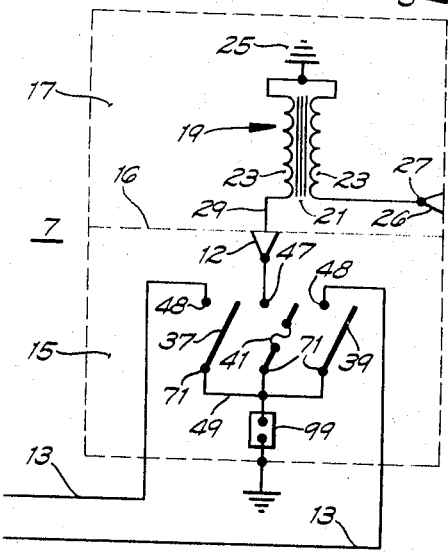
FIG. 4 is a schematic circuit diagram of the embodiment of FIG. 1.

Referring to the drawing, the metallic housing 7 is supported at approximately ground level on concrete pad 9. The metallic housing 7 includes an access door 8, a primary switching compartment 15 and a sealed transformer compartment 17, shown in FIG. 2. The switching compartment 15 and transformer compartment 17 have a common wall 16 provided with an opening 18 (see FIG. 2) through which projects insulator bushing 12. A distribution transformer, designated generally by the reference numeral 19, is mounted within the transformer compartment 17 and includes a magnetic core 21 and primary and secondary windings 23 each having one end commonly grounded at 25. The transformer 19 is shown as being immersed in an insulating medium such as oil 10 or any other suitable dielectric fluid. The ungrounded end of the secondary winding is connected to secondary terminal 27 which is insulated by insulator bushing 26 (see FIG. 4) from the transformer compartment 17. It will be understood that the secondary terminal 27 may extend through a wall of transformer compartment 17 into a secondary compartment (not shown) where a connection may be made to an underground secondary conductor.

Figure 1:
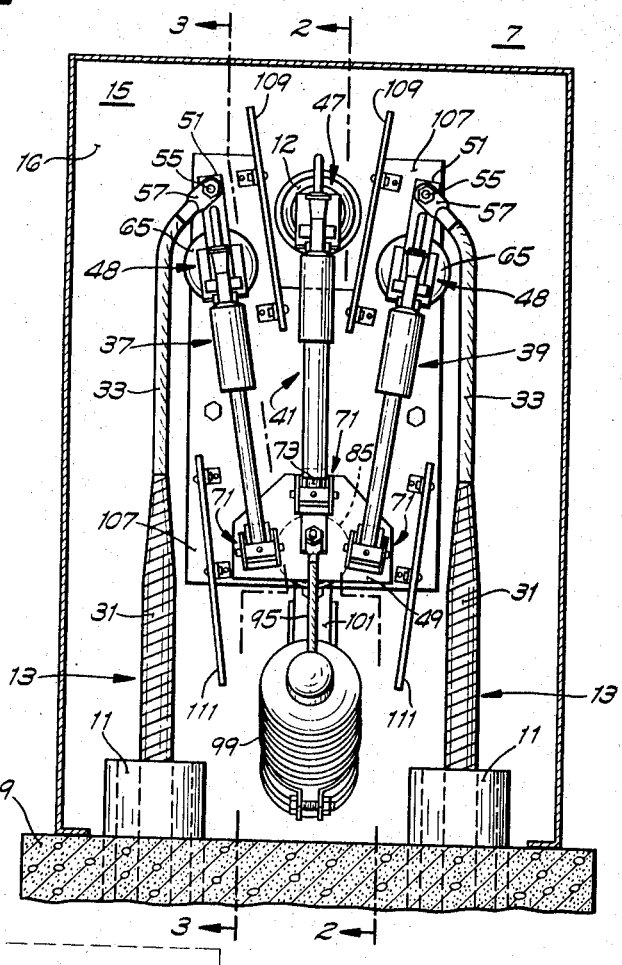
FIG. 1 is a front elevation view of the primary switching compartment of the ground level transformer embodying the invention.

As shown in FIGS. 1 and 3, insulated primary cables 13 enter the lower portion of primary switching compartment 15 through conduits 11. The primary cables 13 are respectively connected at primary terminals 57 through the stress grading cones 31 and insulation 33 to terminal lugs 51 by bolts 55 at the upper ends of sectionalizing switches 37 and 39. The primary lead 29 (see FIGS. 2 and 4) of transformer 19 leads from the transformer 19 to primary terminal rod 28 on insulator bushing 12. The primary terminal rod 28 extends through insulator bushing 12 and connects to stationary contact 47 mounted on insulator bushing 12 within primary switching compartment 15. The stationary contact assembly 47 is electrically connected through a disconnect fuse 41 and an electrical conducting plate or bus bar 49 to sectionalizing switches 37 and 39 (see FIG. 4), thus permitting the following alternative connections of transformer primary lead 29 and primary cables 13:

(1) The connecting of primary lead 29 to both of primary cables 13 when disconnect fuse 41 and both of sectionalizing switches 37 and 39 are closed.

(2) The connecting of primary lead 29 to either one of primary cables 13 when disconnect fuse 41 and either of sectionalizing switches 37 and 39 is closed and the other one of switches 37 and 39 is open.

(3) The connecting of primary cables 13 together and the disconnecting of primary lead 29 and consequently transformer 19 from primary cables 13 when disconnect fuse 41 is open and both of sectionalizing switches 37 and 39 are closed.

By making one of the connections described above, the distribution transformer 19 may be included as part of a loop or modified loop electrical distribution system, or may be completely isolated from the distribution system while still allowing the loop to be maintained by connection through sectionalizing switches 37 and 39.

The disconnect fuse 41 and sectionalizing switches 37 and 39 are preferably constructed as disclosed in U.S. Patent No. 3,235,696 entitled "Load Break Disconnecting Device With Solid Nonconducting Arc Suppression Means" and having the same assignee as the present invention. As shown in FIGS. 1 and 2 the disconnect fuse 41 includes a pulling eye 67, a fuse tube 42, a sleeve 43 and a terminal 73 at its lower end. As shown in FIGS. 1 and 3 the sectionalizing switches 37 and 39 each include a pulling eye, a sleeve 40 and a tubular switch member 38.

The upper end of fuse disconnect 41 is provided with a switch contact member 69 engaging the contact fingers 45 of stationary contact assembly 47. The contact fingers 45 are mounted on support member 59 and electrically connected through support member 59, bushing cap 87 and primary terminal rod 28 to the primary winding of transformer primary and secondary windings 23. The latch release bumper 61 is also mounted on support member 59 and, as described in detail in the patent above referred to functions to hold sleeve 43 in a lowered position when switch contact member 69 is engaged between contact fingers 45. The support member 59 and bushing cap 87 are both held in position on the end of insulator bushing 12 by bolt 63.

As shown in FIGS. 1 and 3, the upper ends of each of the sectionalizing switches 37 and 39 are provided with a switch contact member 69 engaging the contact fingers 45 of stationary contact assembly 48. The contact fingers 45 and the latch release bumper 61 are both mounted on support member 59 (see FIG. 3). The latch release bumper 61 functions to hold sleeve 40 in a lowered position when switch contact member 69 is engaged between contact fingers 45, as described in detail in the patent referred to above. The support member 59 and terminal lug 51 are both held in position on the end of the insulator bushing 65 by bolt 63. As can be seen in FIG. 3, contact fingers 45 are electrically connected to primary cable 13 through support member 59, terminal lug 51 and primary terminal 57.

The sectionalizing switches 37 and 39 and disconnect fuse 41 are each pivotally mounted at their lower ends on a hinge contact assembly 71 affixed to electrically conducting pate 49. The terminal 73 of disconnect fuse 41 and the lower end of tubular switch member 38 of sectionalizing switches 37 and 39 are each provided with trunnions 75 which project for interfitting with slots 79 in U-shaped member 77 of each hinge contact assembly 71. Each hinge contact assembly 71 includes a U-shaped contact spring 81 suitable for maintaining high contact pressure with its respective associated tubular switch member 38 or lower terminal 73. The U-shaped member 77 and contact spring 81 are both affixed in electrical conducting relationship to conducting plate 49 by bolt 83.

The lightning arrester 99 is supported directly below insulator bushing 85 and is electrically connected to conducting plate 49 through lightning arrester lead 95 which is attached to connecting strap 91 by bolt 93 (see FIG. 1). The lightning arrester 99 is supported by bolts 102 on support bracket 101 which is affixed to bosses 105 by bolts 104. The lower one of bosses 105 also serves as a ground lug for lightning arrester 99 and is electrically connected to lightning arrester 99 by ground lead 103.

It is desired that the possibility of destructive flashover between the switches 37 and 39, fuse 41 and metallic housing 7 be minimized and that the size of the metallic housing 7 be kept as small as possible. For this purpose an insulating barrier 107 (see FIGS. 1 and 2) is mounted on common wall 16 between the wall 16 and sectionalizing switches 37 and 39. The insulator bushings 65 and 85 are affixed to insulating barrier 107. It may be seen in FIG. 2 that insulator bushing 12 extends through and is mounted on common wall 16 by suitable mounting means such as screw and ring assembly 89. It will be understood that provision may be made for mounting the stationary contact assembly 47 of fuse disconnect 41 on an insulator which is mounted on insulating barrier 107 and which does not provide for direct connection through the insulator to transformer primary lead 29. Problems of flashover are further minimized by affixing insulating barriers 109 and 111 on insulating barrier 107, as shown in FIGS. 1, 2 and 3.

It may readily be observed that connecting the primary cables 13 to the upper ends of sectionalizing switches results in a reduced height for metallic housing 7. This arrangement allows a major portion of the height of housing 7 to be used for space for the stress grading cones 31, the primary cable insulations 33 necessary to insure against creepage breakdown, and the termination of primary cables 13. It may also be seen that the electrical connection of the lower ends of sectionalizing switches 37 and 39 and disconnect fuse 41 through electrical conducting plate 49 allows the upper ends of the switches 37 and 39 and fuse 41 to be respectively connected to each of primary cables 13 and primary lead 29 of transformers 19. In this manner a height reducing arrangement may be obtained while at the same time maintaining full flexibility in the connecting of primary cables 13 and transformer 19, as previously described.

Referring to FIG. 1, it will be observed that mounting of the lower ends of sectionalizing switches 37 and 39 and disconnect fuse 41 at a substantially common position on conducting plate 49, with respect to the upper ends of the switches 37 and 39, results in the provision of space for bringing primary cables 13 to the upper ends of switches 37 and 39. The advantage of this arrangement is that a reduced housing height may be accomplished without any substantial increase in width to provide the necessary space for terminating the primary cables 13.

It may be further seen from FIG. 1 that the hinge contact assemblies 71 of sectionalizing switches 37 and 39 are mounted at an angle resulting in the pivoting of switches 37 and 39, when they are opened, away from the sides of metallic housing 7. This arrangement further decreases the possibility of flashover between either of the switches 37 and 39 and the housing 7 when one of the switches remains closed while the other is opened.

Another advantage of the switch arrangement of the invention is the provision of space for a lightning arrester within the switching cabinet having convenient access for electrical connection to the electrical conducting plate 49. As shown in FIGS. 1 and 2 the lightning arrester 99 is positioned within metallic housing 7 immediately below conducting plate 49 where an easy electrical connection may be made between the plate 49 and lightning arrester 99.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. In a ground level electrical equipment enclosure, in combination, a support mounted within said enclosure, a first switch means and a vertically positioned fuse means each having upper ends supported in spaced apart insulated relation by said support and lower ends spaced apart a closer distance than the spacing of said upper ends and supported by and in insulated relation with said support, said lower ends being electrically connected together, and a first primary cable entering said enclosure from below ground and being connected to said upper end of said first switch means.

2. The combination of claim 1 wherein each of said switch means and said fuse means include a stationary contact engaging their respective upper ends and said switch means and said fuse means are each pivotally and releasably supported at said common point for movement into and out of engagement with their respective stationary contacts.

3. The combination of claim 1 wherein each of said switch means and said fuse means include a stationary contact engaging their respective upper ends and a hinge attached to their respective lower ends for pivotal movement of said switch means and said fuse means into and out of engagement with their respective stationary contacts, said hinges being arranged to allow pivotal movement of said switch means and fuse means through a vertical plane passing through the center of said common point.

4. The combination of claim 3 further comprising a second switch means having an upper end and a lower end electrically connected to the lower ends of said first switch means and said fuse means, said lower end of said second switch means being supported at said substantially common point by and in insulated relation with said support, said upper ends of said first and second switch means being supported in spaced apart insulated relation on opposite sides of the upper end of said fuse means by said support, said second switch means including a stationary contact engaging its upper end and a hinge attached to its lower end for pivotal movement of said second switch means into and out of engagement with its stationary contact, said hinge being arranged to allow pivotal movement of said second switch means through a vertical plane passing through the center of said common point, and a second primary cable entering said enclosure from below ground and being connected to said upper end of said second switch means.

5. An electrical switch and protective device comprising, in combination, a plurality of insulating supports, a fuse means having an upper end supported by a first one of said insulating supports and a lower end supported by a second insulating support, a first switch means positioned at an upwardly diverging angle relative to the vertical and to said fuse means, said first switch means having a lower end electrically connected to the lower end of said fuse means and supported by said second insulating support and an upper end supported by a third insulating support and a first length of electrical cable positioned substantially below the upper end of said first switch means and electrically connected to the upper end of said first switch means.

6. The combination of claim 5 further comprising a second switch means positioned at an upwardly diverging angle relative to said fuse means, said second switch means having a lower end electrically connected to the lower end of said fuse means and supported by said second insulating support and an upper end supported by a fourth insulating support said fuse means being vertically positioned between said first and second switch means, and a second length of electrical cable positioned substantially below the upper end of said second switch means and electrically connected to the upper end of said second switch means.

7. The combination of claim 6 further comprising first, second and third stationary contact means respectively mounted on said first, third and fourth insulating supports, said first, second and third stationary contact means respectively and individually engaging the upper ends of said fuse means and said first and second switch means, first, second and third hinge means supported by said second insulating support and pivotally and releasable attached respectively and individually to the lower ends of said fuse means and said first and second switch means for pivotally moving said fuse means and said first and second switch means into and out of engagement with said stationary contact means.

8. The combination of claim 7 further comprising bus bar means for electrically connecting said fuse means and the first and second switch means.

9. The combination of claim 7 further comprising housing means for enclosing said electrical switch and protective device, said first and second length of electrical cable each including a stress grading cone positioned substantially within said housing means.

10. The combination of claim 9 further comprising a lightning arrester supported within said housing means below said electrical switch and protective device and electrically connected to the lower ends of said fuse means and said first and second switch means.

11. The combination of claim 1 further comprising a conductive member mounted on said support in engagement with the lower ends of the first switch means and fuse means whereby said lower ends are electrically connected together.

12. The combination of claim 4 further comprising a conductive member mounted on said support in engagement with the lower ends of the first and second switch means and fuse means whereby said lower ends are electrically connected together.

References Cited

UNITED STATES PATENTS

| | | | |
|---|---|---|---|
| 882,892 | 3/1908 | Kenny | 317—71 |
| 1,383,808 | 7/1921 | Horton et al. | 200—3 |
| 1,891,959 | 12/1932 | Sprong | 174—37 X |
| 2,049,552 | 8/1936 | Walsh | 200—115 |
| 3,014,158 | 12/1961 | Nelson et al. | 317—15 |

JOHN F. COUCH, Primary Examiner.

J. D. TRAMMELL, Assistant Examiner.

U.S. Cl. X.R.

174—37; 317—71; 337—33